United States Patent [19]

Lewis

[11] Patent Number: 4,789,197
[45] Date of Patent: Dec. 6, 1988

[54] COVER FOR OPEN BED OF PICKUP TRUCK

[76] Inventor: Jewell V. Lewis, 4022 Linda Vista Dr., Fallbrook, Calif. 92028

[21] Appl. No.: 78,274

[22] Filed: Jun. 10, 1987

Related U.S. Application Data

[63] Continuation-in-part of Ser. No. 867,696, May 27, 1986, abandoned.

[51] Int. Cl.⁴ ............................................. B60P 7/02
[52] U.S. Cl. .................................................. 296/100
[58] Field of Search ............................. 296/100, 216

[56] References Cited

U.S. PATENT DOCUMENTS

| | | | |
|---|---|---|---|
| 3,578,378 | 5/1971 | Anderson | 296/100 |
| 3,762,763 | 10/1973 | Deshores | 296/100 |
| 4,418,954 | 12/1983 | Buckley | 296/100 |
| 4,518,194 | 5/1985 | Kirkham | 296/100 |
| 4,615,557 | 10/1986 | Robinson | 296/100 |

Primary Examiner—Robert R. Song
Attorney, Agent, or Firm—John J. Murphey

[57] ABSTRACT

A removable assembly for covering the open bed of a pickup truck comprising a plurality of rigid cover panels of generally inverted U-shape adapted to straddle the truck side walls across the bed and close together in end-to-end abutting relationship, supported on a pair of spaced-apart support rails that fit into a pair of straight trucks muonted along the top of the truck bed side walls, a rain-collecting groove formed in each panel adapted to span under the abutment relationship with an adjacent panel, the forward most and rearward most panels being lockable with the rearward most panel having a downwardly sloping end wall that covers over the tail gate to lock the whole assembly together without regard to the operability of the tail gate lock.

12 Claims, 5 Drawing Sheets

COVER FOR OPEN BED OF PICKUP TRUCK

CROSS-REFERENCE TO RELATED APPLICATIONS

This is a continuation-in-part of my previously filed application titled "RIGID SLIDE MOUNTED TONNEAU TYPE COVER FOR PICK-UP TYPE TRUCK" filed 5/27/86 and given Ser. No. 867,696, now abandoned.

BACKGROUND OF THE INVENTION

1. Field of the Invention

This invention relates to pickup trucks and to covers for covering the open bed thereof. More particularly, this invention pertains to rigid covers for the open bed of pickup trucks and to means for locking and unlocking them as well as for removing all or portions thereof.

2. Description of the Prior Art

Pickup trucks are preferred over larger, enclosed-bodied trucks because of their lower cost, their greater versatility on construction sites and for the ease in which the truck bed is loaded and unloaded. Pickup truck beds, however, are made open and without a cover. Numerous attempts have been made to make flexible as well as rigid covers for fitting a wide variety of pickup truck beds, see U.S. Pat. Nos. 3,578,378; 3,762,763; 3,773,380; 4,418,954; 4,518,194; and 4,615,557. While these inventions provide covers for truck beds, other problems in one form or another have remained to make these prior problems in one form or another have remained to make these prior art devices not fully compatible with the needs and desires of pickup truck owners.

For instance, prior art mechanisms for securing the panels for protection of the contents in the truck bed and also for allowing the panels to be removed require complicated locking and unlocking hardware that render the units overly expensive. In addition, typical utilization of pickup trucks on construction sites involves rough handling and causes stress to the covers so that rainwater, dust and dirt is allowed to enter the truck bed and damage tools and cargo carried therein. Recently, much popularity has been gained for a tool chest that spans the truck bed from side-to-side, adjacent the cab rear wall. Many prior art devices make it difficult to open the panel nearest the cab for access to this tool chest without completely removing all of the panels from the truck. Further, inter-movement of the panels, for such reasons as loading and unloading large cargo from the truck bed, require rollers or other sensitive hardware to be used to support the panels. This hardware tends to stick and become unusable should the truck be subject to bumping or banging, as is common on the construction site, or from dirt and dust that is always around truck operations. Still further, locks used to secure the truck covers have continually been those of the type that extend out from the sides or from the rear of the truck posing hazards to pedestrian traffic passing close by. Even further, many pickup trucks have damaged rear tail gate locking mechanisms, stemming from long use and rough handling, and many prior art covers require the existence of an operable locking mechanism so that pickup trucks are not capable of using the prior art covers to their fullest extent without undergoing expensive repair of the tail gate locking mechanism.

Finally, most prior art pickup truck cover devices require two persons to place the covers on the truck bed, generally one at each side, to insert the rail or other track rider onto the track that is generally positioned along the top of the sides of the truck bed. With these designs, single person operation of the cover mechanism poses a singular labor problem.

The present invention overcomes all of the problems that have heretofore existed in the prior art. This invention consists of a plurality of panels that span the truck bed from side to side and are arranged to slide upon and be carried upon tracks laid atop the sides of the truck bed. The panels are adapted to assemble in front-to-rear abutment with the front-most panel adjacent the cab rear wall adapted to pivot upward to allow access to the tool chest located in the front of the truck bed. Molded-in rain gutters convey rain water away from the cover to the outside of the truck. The panels may be locked by locking mechanisms that are positioned above the truck cover allowing the sides of the truck to be free of exposed safety hazards. Further, the cover in assembled configuration locks the tail gate without need to resort to the tail gate locking mechanism. Finally, the panels are arranged to allow assembly and disassembly by one person on a rail-track design that involves a scraping or self-cleaning operation thereto.

SUMMARY OF THE INVENTION

Accordingly, the main object of this invention is a rigid cover for pickup truck beds adaptable to easy assembly and disassembly by one person. Other objects of the invention include a cover that will withstand rough handling and yet seal the internal cargo against rain and other elements; a cover that contains locking means accessible from above the cover leaving the sides and rear of the pickup truck free from personal safety hazards; a cover that utilizes inexpensive and easy to apply self-cleaning track-rail carrying means; a truck cover that may be locked to secure the cargo therein without need to utilize the tail gate locking mechanism; and, a cover that is easily assembled by one person.

The invention comprises a plurality of rigid cover panels of generally inverted U-shape adapted to straddle the truck side walls across the bed, and close together in end-to-end abutment relationship, supported by rails on tracks mounted atop the truck side walls, a rain water collecting groove formed in each panel adjacent one of the end-to-end abutments, the forward-most panel adapted to pivot upward to allow access to the front of the truck bed, the rearward-most panel adapted to engage the top of the tail gate in locking relationship and means engageable with the straight tracks to lock the assembly and the tail gate in secure position from atop the panels independent of the operability of security mechanisms in the tail gate.

These and other objects of the invention will become more apparent upon reading the following description of the preferred embodiment taken together with the drawings appended hereto. The scope of the invention claimed by the inventor may be obtained from a fair reading of the claims that conclude this specification.

DESCRIPTION OF THE PREFERRED EMBODIMENT

Figure 1:
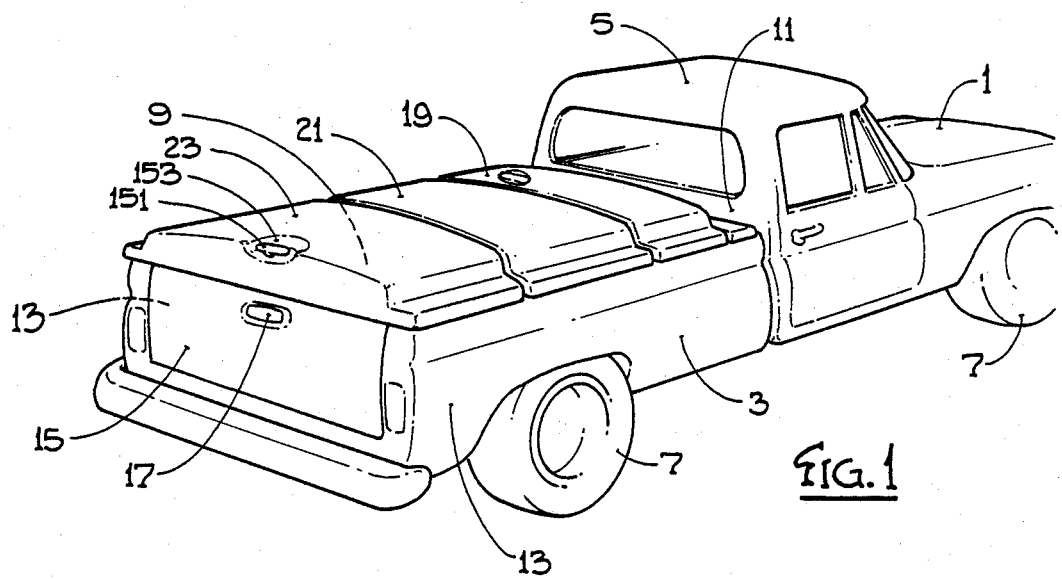
FIG. 1 is an isometric view of a typical pickup truck showing the invention covering the bed thereof.

As shown in the drawings, where like elements are labeled with like numerals throughout the fourteen figures, a typical pickup truck on which this invention may be used is shown in FIG. 1 and shows a truck comprised of a front end motor compartment 1 and a rear end transport section 3 separated by a passenger-driver compartment 5 all of which is supported on an internal chassis (not shown) and a set of multiple wheels and tires 7. The bed or cargo area 9 is supported by the rear wheels and axle and is defined by a rear cab wall 11, opposed side walls 13 and an upstanding tail gate 15. In most pickup trucks, access to bed 9 may be through the top open portion defined by the aforesaid cab wall 11, side walls 13 and tail gate 15 or through pivoting of the tail gate 15 at the lower end thereof to swing outward to stop horizontally and form an extension of bed 9. A locking mechanism 17 is generally located in the upper central portion of tail gate 15 for locking tail gate 15 in a fully upright position.

Figure 2:
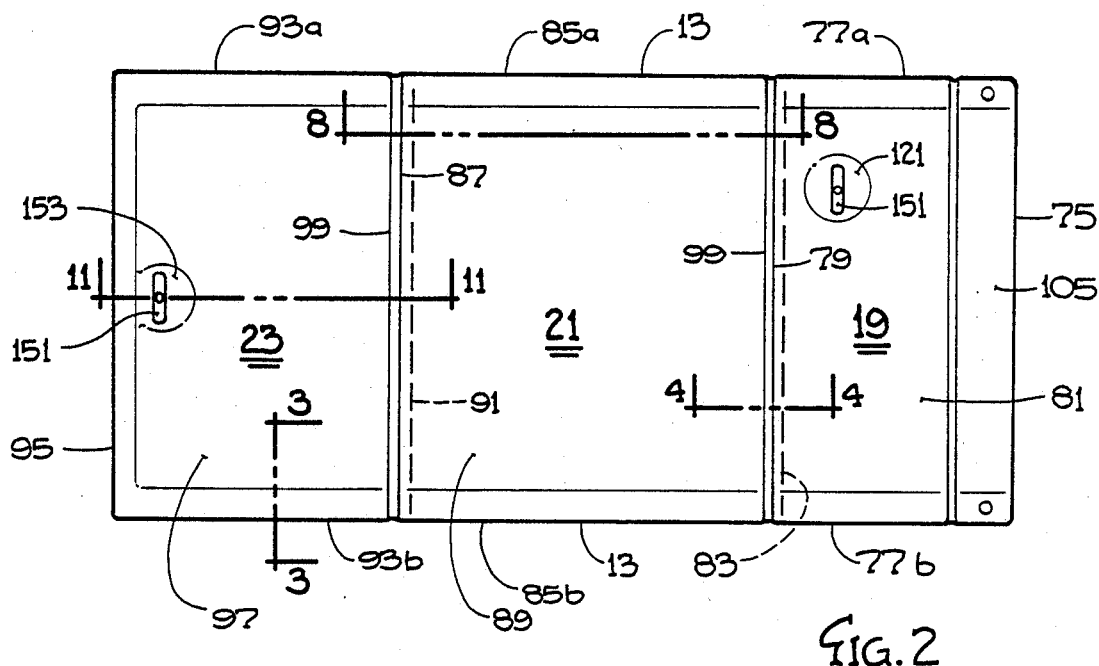
FIG. 2 is a top plan view of the embodiment of the bed shown in FIG. 1 in its closed configuration.
Figure 10:
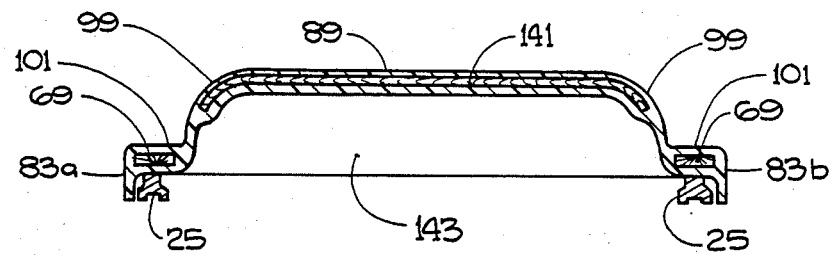
FIG. 10 is a vertical sectional end view of the central cover panel taken along lines 10—10 in FIG. 9.

The cover panels of this invention are light in weight, preferably made from glass-reinforced resinous material, and have a generally inverted U-shape cross-section as shown in FIG. 10. While a plurality of panels is preferred in this invention, only three panels are shown as that number is generally sufficient to encompass the full length and breadth of most pickup trucks. As shown in FIGS. 1 and 2, the panels comprise a forward-most panel 19, a center panel 21 and a rearward-most panel 23. For clarity, while forward-most panel 19 and rearward-most panel 23 terminate the front and back of the truck bed 9 respectively, central panel 21 may comprise a number of shorter panels to accommodate truck beds of various length and all of these modifications are fully contemplated within the scope and spirit of this invention. Panels 19, 21 and 23 are adapted to straddle across bed 9 from side wall 13 to side wall 13 and close together in end-to-end abutment relationship from forward-most panel 19, adjacent cab rear wall 11, through central panel or panels 21 to rearward-most panel 23 that is positioned adjacent tail gate 15. All of the panels are supported by an underlying pair of spaced-apart metal support rails 25.

Figure 3:
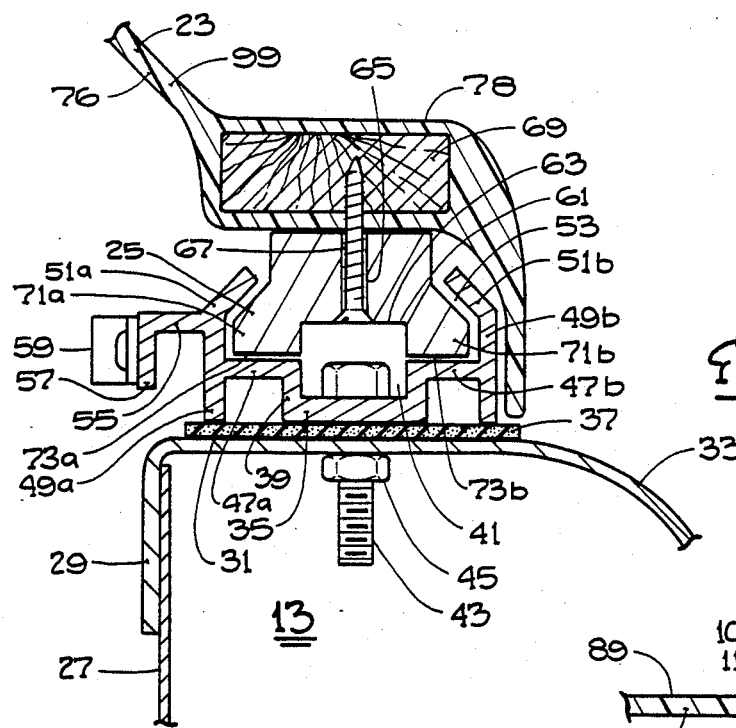
FIG. 3 is a partial vertical sectional view of the track mounted atop the side wall of the truck bed supporting the overlying portion of the cover and its support rail taken along lines 3—3 in FIG. 2.

Shown in FIG. 3 in vertical sectional view is a portion of truck side walls 13 showing it to comprise an inner bed-defining vertical wall 27 that traverses from the bottom of the bed to the top of side wall 13, and a cap plate 29 that overlays the top margin of vertical side wall 27 and then extends outward to form a flat surface 31 and thereafter continue in an outwardly and downwardly direction to form the outer side wall and fender area 33 of the pickup truck. Atop flat portion 31 and continuing longitudinally along the top of both truck bed side walls 13 is laid a pair of straight support tracks 35 from a location near the tail gate 15 forward to cab rear wall 11. Support tracks 35 are separated from cap plate flat portion 31 by a strip of sealing gasket material 37 to ward off the influx of wind, dust and rain water into bed 9. Support track 35 comprises a center web 39 defining a depressed center groove 41 through which are passed anchor bolts 43 that are anchored with nuts 45 on top of the bed-defining fenders. From center web 39 extend a pair of webs 47a and 47b generally parallel to flat portion 31; web 47a extends inward toward the truck bed 9 while web 47b extends outward therefrom. Center webs 47a and 47b terminate at their outer marginal edges at a pair of inner and outer vertical flanges 49a and 49b respectively, the bottom marginal edges of said flanges resting atop said fender flat portion 31 to provide stability to support tracks 35. Said vertical flanges extend upwardly and provide support to a pair of mutually inwardly projecting wall portions 51a and 51b that, in combination with center web 39, connecting webs 47a and 47b, and vertical flanges 49a and 49b, define an open-top elongated cavity 53 for receipt therein of metal cover support rails 25 in sliding relationship therewith. A second connecting web 55 extends inward toward truck bed 9 from vertical flange 49a terminating in a vertical support flange 57 on which is mounted a locking block 59 as will hereinafter be more fully explained.

Cover support rails 25 are received in open-top cavity 53 and comprise a central mounting portion 61 defining a depressed longitudinal groove 63 through which apertures 65 are formed for receipt of flat head screws 67 for penetration into a wood reinforcing slat 69 imbedded in panels 19, 21 and 23. Extending outward and downward from center web 61 are support webs 71a and 71b that engage, along their bottom marginal edges 73a and 73b, the top surface of outer connecting webs 47a and 47b in sliding relationship therewith. The inward slant or taper of projecting walls 51a and 51b retain support rails 25 therebetween and, along with vertical flanges 49a and 49b prevent rails 25 and cover panels 19, 21 and 23 from falling out of tracks 35.

Figure 4:
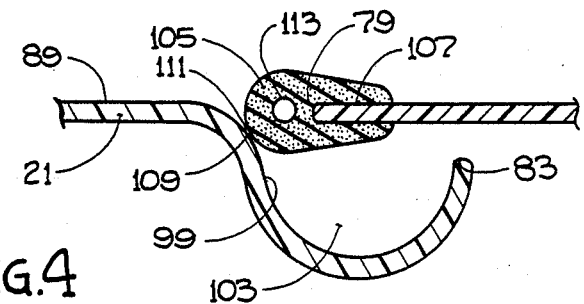
FIG. 4 is a side elevational view in section showing the abutment of one panel against another with the underlying rain water collecting groove and gasket taken along lines 4—4 in FIG. 2.

Cover panel 19 is defined by a front edge 75, side edges 77a and 77b rear edge 79, and top plate 81; central panel 21 is defined by front edge 83, side edges 85a and 85b; rear edge 87 and top plate 89; and, rearward-most panel 23 is defined by front edge 91, side edges 93a and 93b, rearward-most edge 95 and top plate 97. All of the cover panels have a descending transition portion 99 that transcends from the plate to just above support rails 25 along the sides thereof, and to just above the rear edge of rear cover panel 23. A second horizontal transition portion 101 extends from portion 99 to the respective edges of said panels. Rear edge 79 and front edge 83 as well as rear edge 87 and front edge 91 are adapted to close together in overlapping relationship to seal the covers together over bed 9. As shown in FIG. 4, a forward facing rain water collecting groove 103 is formed adjacent and set back along front edges 83 and 91 adapted to span the width of their respective panels, across truck bed 9, and underlie the abutment between said adjacent panels 19-21 and 21-23 to convey rain water off of plates 89 and 97 that may enter along the inverted U-shapes of said panels to be discharged outboard of tracks 35 and over truck sides 13. Rain water collecting groove 103 may be formed along the rear edge of central panel 21 and the same is fully contemplated within the scope of this invention. The preferred construction is as shown and is preferred because the combined forward acceleration of the truck and rearward relative air flow over said cover panels tends to force rainwater rearward in the grooves as it moves laterally. A deformable gasket 105 may be operatively received over rearward edges 79 and 87, said gasket containing an edge-receiving portion 107 and a deformable abutment portion 109, for abutment against a forward edge 111 of the contacting panel. Optionally, an elongated aperture 113 is formed along gasket 105 to permit more flexibility of said gasket upon contact between said gasket portion 109 and the forwarding edge 111 of said adjacent panel.

Figure 5:
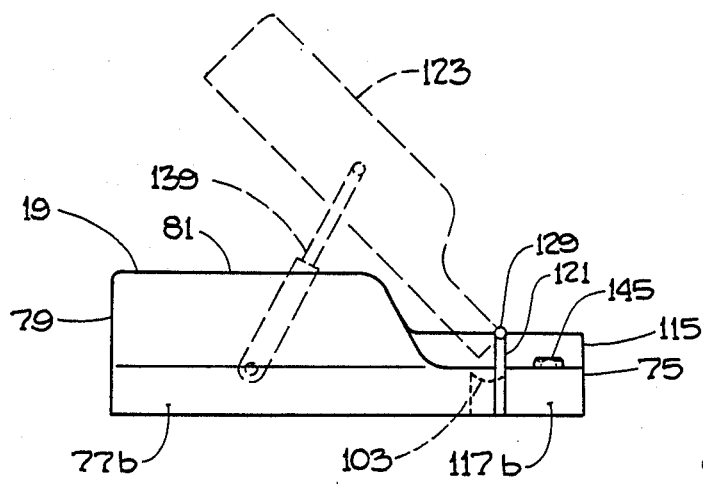
FIG. 5 is a side elevational view of the forward-most cover panel showing, in dotted outline, the panel opened pivotally upward to allow access to the front of the truck bed.

As shown in FIG. 5, said forward-most panel 19 comprises a narrow, forward support arm 115, spanning truck bed 9 and having said front edge portion 75 for position against cab rear wall 11, mounted at its terminal ends 117a and 117b (see FIG. 7) on a short pair of said spaced-apart support rails 25. Said short sections of rails 25 are received in the forward-most portion of track 35 to support said arm 115 thereon. Support arm 115 is defined along its rearward-most portion by an edge 119 and a depending wall portion 121. A rearwardly-facing rain water collecting groove 103 is formed therebetween, spanning panel cover 19. The rest of forward-most panel 19 comprises a pivotable cover panel 123 defined by opposed parallel panel side edges 77a and 77b that are joined at their terminal ends by front and rear edges 125 and 79 respectively. Front edge 125 has formed therealong a depending surface 127. An elongated hinge 129, comprising a pair of elongated hinge leaves 131 and 133, pivotally attached along one side by pin member 135 is attached to depending surface 127 and depending wall portion 121 by fasteners (not shown) received through apertures 137 with pin 135 arranged at the top so that upward pivotal movement of cover panel 123 may be obtained without losing attachment with forward support arm 115. A telescoping support 139, such as a pressurized gas-cylinder shock absorber, is operatively connected between pivotable cover panel 123 and truck bed 9 to provide support to cover panel 123 in its upwardly pivotal position.

Figures 6, 7:
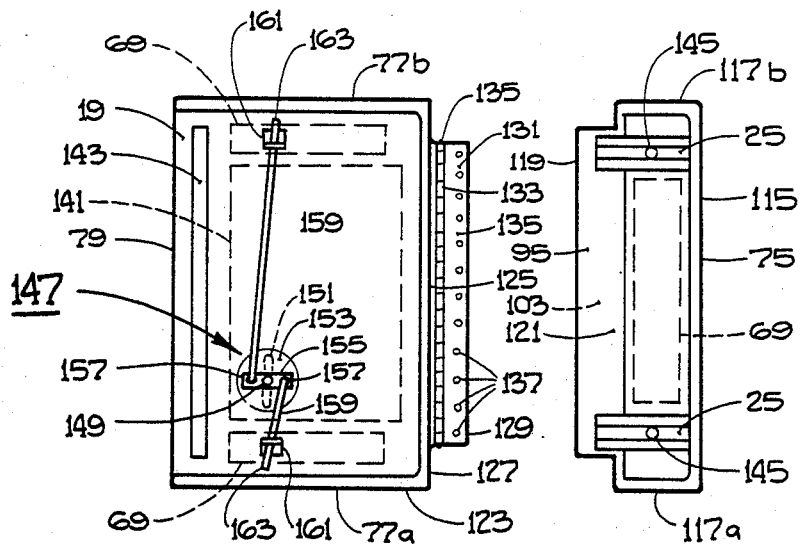
FIG. 6 is a bottom plan view of a portion of the forward-most cover in its closed configuration shown in FIG. 5.
FIG. 7 is a bottom plan view of the forward support arm for the forward-most cover panel shown in FIG. 5 but set apart from the hinge as shown.

In FIG. 6 is shown the underneath view of cover panel 123 and shows said panel to contain within its wall thickness a pair of opposed anchor slats 69, a stiff sheet reinforcing member 141 and a vertical cross-brace 143, all preferably imbedded in some portion of the wall 101 and plate thickness making up cover panel 123. As previously mentioned, said panels of this invention are preferably made from a glass reinforced resinous material. The aforesaid anchor slats 69, reinforcing member 141 and brace 143 are conveniently made a part of the resinous wall thickness by placing them in between layers of fiberglass mat or cloth or surrounding them with sheets of fiberglass mat or cloth prior to the molding operation and thereafer compressing and molding these components into the final product. Reinforcing member 141 and anchor slats 69 are placed in the plate and second transition portions, respectively, of cover panel 123 to provide support for the lateral span of said cover panel across truck bed 9 while brace 143 provides added support across the general span of cover panel 123 and resistance against distortion of rear panel edge 79 as well as support of the cover to anything overlaid thereon. A similar anchor slat 69 is molded inside and along forward support arm 115 to provide support thereto. While pivotable cover panel 123 is not anchored directly to the truck, forward support arm 115 is mounted thereto by bolts 145 passing down through terminal arm ends 117a and 117b, through support rails 25, through gasket strip 37 and flat portion 31 and into the fender area to receive thereon a nut (not shown) similar to the configuration shown in FIG. 3.

As further shown in FIG. 6, a means 147 is provided in pivotable cover panel 123 to lock said panel in a secure downward position for protection of the contents, and the tool kit and tools, generally placed in the front of truck bed 9. As shown, locking means 147 comprises a first cam-type fastener 149 mounted under cover plate 81. A turnable handle 151 extends upward from fastener 149 (see FIG. 2) through an aperture (not shown) to a molded-in depressed area 153 in cover panel 123 that is adapted to be locked and unlocked with a key or other convenient security device. A pair of connecting arms 155 are attached to fastener 149 extending outward a short distance below cover plate 81 having pivotal points 157 formed thereon. A pair of locking traverse rods 159 are pivotally mounted to points 157, extend respectively sideways across the width of cover panel 123 and pass through a pair of guide clips 161, mounted on anchor slats 69, each rod having an end 163 adapted to enter a locking block 165 upon turning of handle 151.

Figure 13:
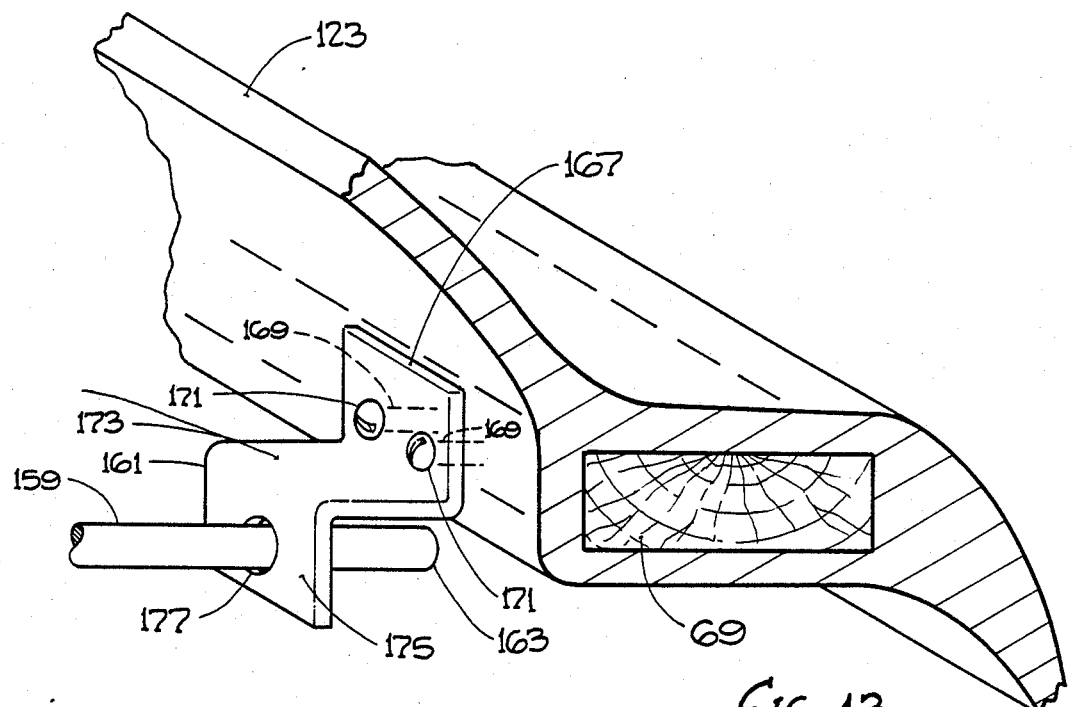
FIG. 13 is a perspective view, on an enlarged scale, of a guide clip for the transverse locking rod shown in FIGS. 6 and 12; and, FIG. 14 is a perspective view, on an enlarged scale, of a locking bar shown in position against the track shown in FIGS. 6 and 12.

Guide clips 161 are shown in FIG. 13 to comprise a mounting plate 167 containing a pair of apertures 169 for receipt of screws 171 or other fastening means to the interior of panel 123. An upstanding web 173 extends upward from mounting plate 167 terminating in a downwardly extending clip web 175 having formed therein an aperture 177 for receipt therethrough of reciprocally moveable traverse rod 159.

Figure 14:
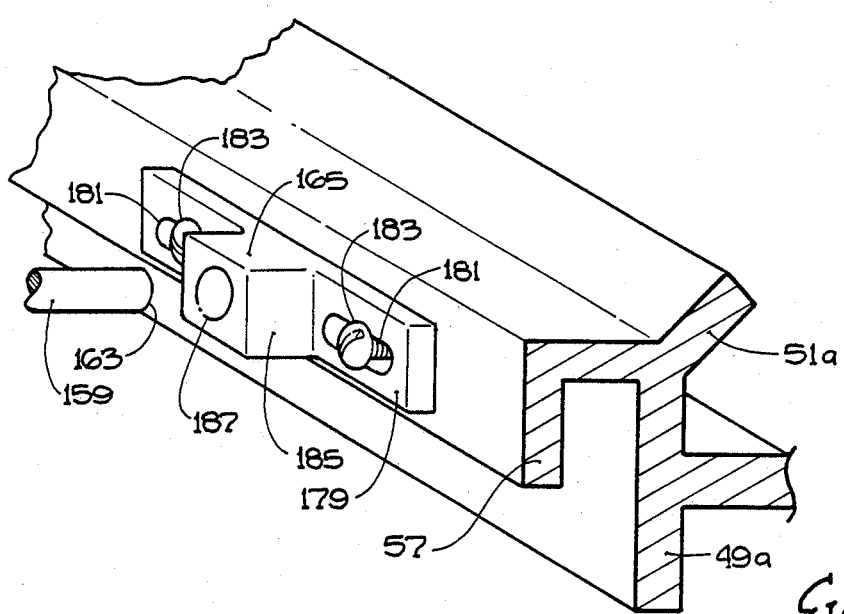

Locking block 165 is shown in FIG. 14 to comprise a base plate 179 having a pair of elongated slots 181 formed therethrough for receipt of screws 183 for other mounting fasteners to attach plate 179 to support flange 57. A locking boss 185 extends upward from base plate 179 and has formed therein an aperture 187 for receipt of the end 163 of traverse rod 159 when handle 151 is turned to rotate connecting arms 155 in a direction forcing traverse rods 159 to extend further toward locking blocks 165 and force the end 163 of traverse rod 159 into aperture 187 in locking relationship therewith.

Figure 8:
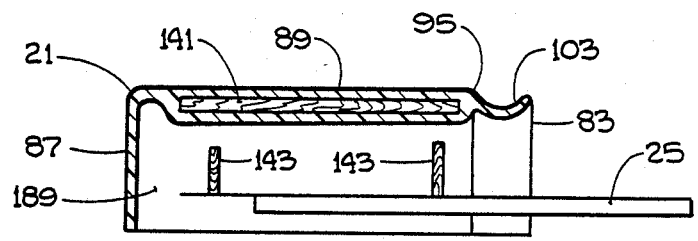
FIG. 8 is a vertical sectional side view of the central cover panel taken along lines 8—8 in FIG. 2.
Figure 9:
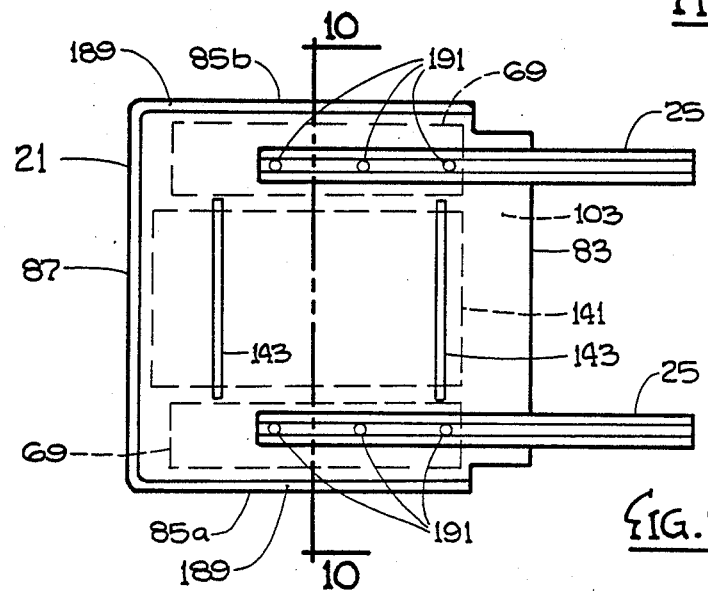
FIG. 9 is a bottom plan view of the whole central cover panel.

FIGS. 8 and 9 show central cover panel 21 to be defined along edges 85a and 85b by opposed, downwardly sloping side walls 189 that are adapted to fit over support rails 25 and support tracks 35, said side walls 189 being terminated at rain water collection groove 103 and rear edge 87. As in pivotable cover panel 115, central panel 21 is reinforced along by wood anchor slats 69, stiff sheet reinforcing member 141 and vertical braces 143. Slats 69 and member 141 are shown in dotted outline in FIG. 9 and in sectional view in FIG. 8. Again, these members are incorporated into the resinous material forming the wall and plate thicknesses of central panel 21. A pair of support rails 25 are shown extending forward from central panel 21 and being anchored by screws 191 pass through apertures (not shown) in rails 25 into wood anchor slats 69. It should be noted that support rails 25 extend substantially forward of central panel 21 and are inset from rear panel edge 87 for the purpose of allowing an individual to stand at the rear of central panel 21, such as shown in FIG. 10, hold central panel 21 horizontal with the forward projecting portions of support rails 25 facing forward of bed 9 and observing, in this position, the insertion of the forward ends of rails 25 in support tracks 35 and thence to push forward on panel 21 to slide said panel on said tracks over truck bed 9 thereby eliminating the need for two individuals holding said panel at opposite side portions thereof as is necessary in the prior art. The intermovement of rails 25 over tracks 35 operates to clean the connection therebetween and to insure nonsticking action therebetween.

Figure 11:
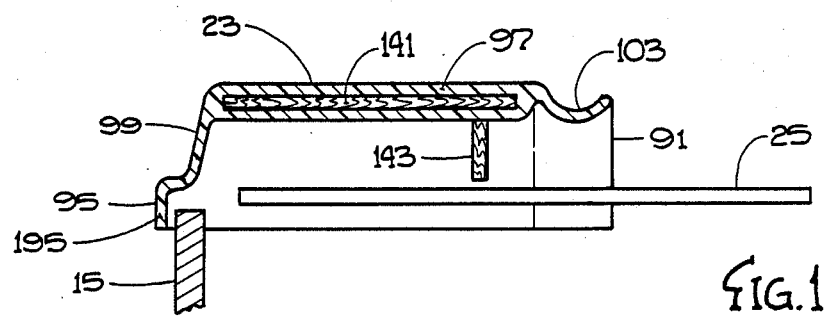
FIG. 11 is a vertical sectional side view of the rear-most cover panel taken along lines 11—11 in FIG. 2 with the locking hardware removed for clarity.
Figure 12:
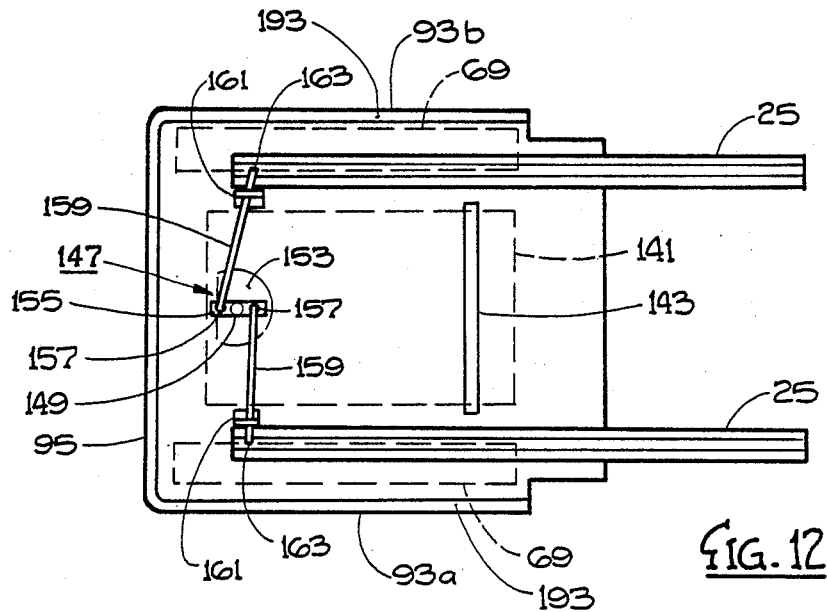
FIG. 12 is a bottom plan view of the whole of the rear-most cover panel.

FIG. 11 shows rearward most panel 23 to be defined along edges 93a and 93b by opposed, downwardly sloping side walls 193, said side walls 193 being terminated at the front thereof by rain water collecting groove 103 and at the rear thereof by descending end wall 195. Forward-most edge 91 defines the rain water collection groove 103 as aforesaid. Descending end wall 195, depending from edge 95, extends both outward and downward over the outside of tail gate 15. Said descending end wall 195 is arranged, when panels 19, 21 and 23 are positioned in assembled configuration over truck bed 9, to extend downward over the outside of the upper portion of tail gate 15 to be lockable as a total assembly without regard to the operability of separate tail gate locking means 17. Panel 23 contains anchor slats 69, stiff sheet reinforcing member 141, both shown in dotted lines, as well as brace 143, said components being used for the same reasons set forth previously for the other panels.

A second locking means 147 is provided in rearwardmost panel 23 comprising a second cam-type fastener 149 mounted under cover plate 97. A second turnable handle 151 extends upward from fastener 149 (see FIG. 2) through an aperture (not shown) in a second molded-in depressed area 153 in cover panel 23 that is adapted to be locked and unlocked with a key or other convenient security device. A second pair of connecting arms 155 are attached to fastener 149 extending outward a short distance below cover panel 23 having second pivotal points 157 formed thereon. A second pair of locking traverse rods 159 are pivotally mounted to points 157, extending respectively sideways across the width of cover panel 23 and pass through a second pair of guide clips 161, mounted on anchor slats 69, each rod having an end 163 adapted to enter a second locking block 165 upon turning of handle 151. Handles 151 may be of the type that permit them to be pushed down against the top of panels 123 and 23 when in the locked position and thereafter pulled up or popped up with the fingers to allow them to be easily grasped and turned to unlock the aforesaid panels.

What is claimed is:

1. A removable assembly for covering the opened bed of a pickup truck defined by the cab rear wall, opposed side walls and tail gate, comprising:
    (a) a plurality of rigid cover panels of generally inverted U-shape adapted to straddle the truck side walls across the bed and close together in end-to-end abutting relationship, from a forward-most position adjacent the truck cab to a rearward most position adjacent the tail gate, each panel containing a pair of spaced-apart support rails;
    (b) a pair of straight tracks mounted in spaced-apart parallel relationship atop the truck side walls adapted to receive said cover panel support rail pairs in sliding relationship therewith for fore and aft movement along the length of the truck bed;
    (c) a rain water collecting groove formed in each said panel adapted to span the width thereof, across the truck bed and underlie a portion of one of the other said panels;
    (d) said forward-most panel adapted to pivot upward to allow entry into the front of the truck bed;
    (e) said rearward-most panel adapted to engage the top of the tail gate in locking relationship therewith; and,
    (f) means, engageable with said straight tracks, to lock said assembly and the tail gate in secure position from atop said panels independent of the security mechanism of the tail gate.

2. The assembly of claim 1 wherein said panels are formed of glass-filled resin.

3. The assembly of claim 1 wherein said panels contain areas of reinforcement.

4. The assembly of claim 3 wherein said reinforcement comprises wood slats.

5. The assembly of claim 3 wherein said reinforcement comprises sheets of stiff paneling.

6. The assembly of claim 3 wherein said panels contain reinforcing wooden slats and sheets of stiff paneling.

7. The assembly of claim 1 wherein said forward most panel comprises:
    (a) a narrow, forward support arm spanning the truck bed having a front edge adjacent the cab rear wall, mounted at its ends on a short pair of said spaced-apart support rails that are received in the forward-most position of the straight tracks, and having an edge forming an underlying concave rain water collecting groove therealong;
    (b) a rearward cover panel pivotally engaged to said forward support arm, forward and above said rain water collecting groove; and,
    (c) means to support said cover when in an upward pivotal position.

8. The assembly of claim 7 wherein said support rails are carried only by said support arm, in said forward-most panel, so that said rearward covered panel may be pivoted from its open position down into full cover contact with the next adjacent rear panel.

9. The assembly of claim 1 wherein said support rails on all but said forward-most panel extend forward of said panels and are set inward from the rear of said panels to permit observation of insertion of said rails in said tracks by a person holding said panels at the rear thereof.

10. The assembly of claim 1 wherein said straight tracks comprises a center web for positioning atop the truck bed side wall plate and having a depressed center groove therealong containing apertures therethrough for receipt of mounting bolts, opposed outward extending inner and outer connecting webs attached, at their terminal edges, to respective inner and outer vertical flanges, each said flange having a lower marginal edge for resting on said side wall plate, and an upwardly extending flange supporting an inwardly projecting wall, the space atop said center web and interior of said inwardly projecting walls defining an area for receipt therein of said cover panel support rails in sliding communication therewith and a second connecting web extending from said inner vertical flange toward the truck bed for supporting a vertical flange thereon upon which is adapted to support a locking block for receipt of a latching rod in locking engagement therewith.

11. The assembly of claim 1 wherein said means to lock said assembly comprise:
 (a) a cam-type fastener mounted under said cover panel;
 (b) a turnable handle extending upward from said fastener, through said cover panel, adapted to be locked and unlocked;
 (c) a pair of connecting arms attached to said fastener extending outward under said cover panel, and having pivotal points formed thereon; and,
 (d) a pair of locking traverse rods pivotally mounted to said points extending sideways across the width of said cover panels, each said rod having a terminal end adapted for locking receipt in a locking block mounted to said straight track.

12. The assembly of claim 1 including a deformable gasket supported along said lateral edge of said cover panel for abutment with an adjacent panel edge carrying said rain water collecting groove to prevent entrance of water into said groove.

* * * * *